United States Patent
Borner et al.

[15] 3,704,996
[45] Dec. 5, 1972

[54] OPTICAL COUPLING ARRANGEMENT

[72] Inventors: Manfred Borner, D-79 Ulm, Danube; Stefan Maslowski, D-7911 Aufheim; Oskar Krumpholz, D-79 Ulm, Danube all of Germany

[73] Assignee: Licentia Patent-Verwaltungs-gesellschaft m.b.H, Frankfurt am Main, Germany

[22] Filed: Oct. 22, 1970

[21] Appl. No.: 82,937

[30] Foreign Application Priority Data

Oct. 23, 1969 Germany.....................P 19 53 283.3
Oct. 23, 1969 Germany.....................G 69 41 157.0

[52] U.S. Cl.............350/96 WG, 250/227, 331/94.5, 350/163
[51] Int. Cl..............................................G02b 5/14
[58] Field of Search.........350/96 WG, 163; 356/112; 250/227

[56] References Cited

UNITED STATES PATENTS

| | | | |
|---|---|---|---|
| 3,171,881 | 3/1965 | Morokuma | 356/112 |
| 3,295,911 | 1/1967 | Ashkin et al. | 350/96 WG UX |
| 3,387,909 | 6/1968 | Anderson et al. | 350/96 WG X |
| 3,455,622 | 7/1969 | Cooper | 350/166 X |
| 3,470,329 | 9/1969 | Young | 350/163 UX |

OTHER PUBLICATIONS

Schineller "Single-Made-Guide Laser Components" Microwaves Vol. 7, No. 1, Jan. 1968, pp. 77–5.

*Primary Examiner*—John K. Corbin
*Attorney*—Spencer & Kaye

[57] ABSTRACT

An optical coupling arrangement for coupling the data modulated light beam from the output of one optical device to the input of a further optical device which permits transmission of the desired band width but substantially avoids mode mismatching. The desired coupling is achieved by providing a pair of reflective surfaces, i.e. mirrors, which face one another and are spaced with respect to one another so that they define an optical resonator for the wavelength of the light to be transmitted in the coupling medium therebetween, connecting the output of one of the optical devices to a light permeable aperture in one of the reflective surfaces and connecting the input of the other optical device to a light permeable aperture in the other of the reflective surfaces.

13 Claims, 3 Drawing Figures

INVENTORS.

Manfred Börner
Stefan Maslowski
Oskar Krumpholz

BY *Spencer & Kaye*

ATTORNEYS.

OPTICAL COUPLING ARRANGEMENT

BACKGROUND OF THE INVENTION

The present invention relates to an optical coupling arrangement for the transmission of a data modulated light beam from the output of an optical device to the input of at least one other optical device.

From the microwave art a number of techniques are known for suppressing the occurrence of interfering reflections at the junction points in hollow waveguide systems, along curves in the transmission lines or at the input and output coupling points for microwave power. In systems with low damping such reflections, aside from the fact that the result of repeated reflections may lead to correspondingly high accumulation of reactive power, sometimes substantially limit the bandwidth of the data to be transmitted.

Compared to the microwave systems, optical transmission systems must be considered to be narrow band systems. The processing speed for data in such systems is limited by the transmission characteristics of the modules employed, e.g., semiconductor circuits in digital pulse processing stages or in linear amplifiers. If the highest pulse or modulation frequency of such digital processing elements is, for example, a frequency $f_m = 1$ GHz $= 10^9$ Hz, then, when the carrier frequency of a light beam (e.g., laser beam) of approximately $f_T = 10^{14}$ Hz is modulated with this frequency, a relative bandwidth of $B_r = f_m/f_T = 10^{-5}$ is to be transmitted.

Interfering reflections occur in optical transmission systems largely as a result of mode mismatching between the various components. It is known that the number of modes able to propagate in a glass fiber waveguide decreases with decreasing diameter. If the diameter of such a light-conductive fiber lies in the order of magnitude of the wavelength of light, only one mode, the fundamental mode, can be excited. This brings about the difficulties which result, for example, when two light-conductive fibers are coupled together since a pure mode transmission is not possible through the use of focusing means, such as a lens, for example.

SUMMARY OF THE INVENTION

It is therefore the object of the present invention to provide an optical coupling arrangement which permits the transmission of the required relative bandwidth, e.g., $B_r = 10^{-5}$, of the modulated light beam and, which nevertheless, substantially avoids mode mismatching and thus a reduction in efficiency of transmission.

This is accomplished according to the present invention in that the two optical devices are coupled together by means of an optical resonator or interferometer. According to the invention, two reflecting surfaces, each of which consists of at least one individual mirror, are provided and are arranged so that they face each other and are spaced with respect to one another so as to define an optical resonator for the frequency of the light to be transmitted in the coupling medium between the reflecting surfaces. Each of the reflecting surfaces is provided with a light permeable aperture and the output of one of the optical devices is coupled to the aperture in one of the reflective surfaces while the input of the other of the optical devices is coupled to the aperture in the other of the reflective surfaces.

According to various features of the invention, the reflective surfaces may be either planar or curved to provide a focus or the coupling medium may be air or some other light transmissive substance such as glass. According to a preferred construction of the resonator, the coupling medium is a light fiber conductor having a core whose diameter is greater than that of the light permeable apertures in the reflective surfaces.

According to a further feature of the invention, at least one of the optical devices being coupled by means of the resonator according to the invention is a light fiber conductor while the other optical device may be either a further light fiber conductor, a laser diode, or a photodiode.

According to a further feature of the invention, alignment between the aperture and the reflective surface and the respective input or output of the respectively connected optical device is insured by forming the aperture after the optical device has been connected to the reflective surface. According to this method feature of the invention, the side of the reflective surface opposite that to which the optical device is connected is covered with a layer of photosensitive lacquer material which is then exposed by light transmitted by the respectively connected optical device through the reflective layer. The exposed portion of the lacquer layer is then removed in a suitable manner and the thus exposed underlying portion of the reflective surface is etched to provide a desired light permeable aperture. The remainder of the layer of lacquer material is subsequently removed to provide the desired reflective surface with its aperture accurately aligned with the connected optical device.

DESCRIPTION OF THE PREFERRED EMBODIMENTS

Figure 1:
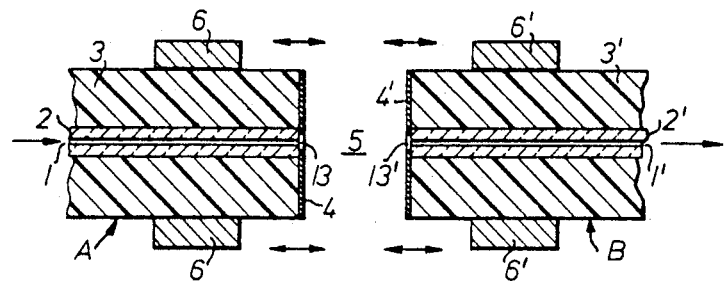
FIG. 1 is a schematic sectional view of one embodiment of a coupling arrangement according to the invention for coupling together two light fiber conductors.

Turning now to the figures, FIG. 1 shows an arrangement according to the invention wherein the two optical devices to be coupled together are light-conductive fibers A and B. Since the various components associated with each of the two fibers is essentially the same, similar components bear similar reference numerals, e.g., 1 and 1', respectively. Additionally, the same element or component in each of the figures bears the same reference numeral.

In FIG. 1, an incident data modulated light wave, e.g., from a laser (not shown) is to be coupled from the conductor fiber A to the conductor fiber B as indicated by the arrows at the extreme right and left hand portions of the figure. The incident light wave is coupled to the inner core 1 of the coaxial glass fiber waveguide A consisting of inner core 1 and an outer core 2, which for supportive reasons are enclosed within a sheathing 3 of any desired refractive index. The output from the coupling arrangement occurs via the inner core 1' of the conductor fiber B. The diameters of the various portions of the coaxial glass fiber waveguides in the illustrated embodiment are approximately equal to 1μm for the cores 1 and 1', 60μm for the outer cores 2 and 2', and 1 to 10mm for the additional sheathing layers 3 and 3'. The indices of refraction of the inner and outer cores of the coaxial glass fiber waveguides are approximately equal to 1.6 and 1.5 respectively.

The ends of the conductors A and B which are to be coupled together are each connected to a reflective surface 4 or 4', respectively. Preferably, as illustrated, reflective surfaces 4 and 4', which consist of a metallic or dielectric mirror with a high reflection capability (approximately equal to 100 percent), are formed on the ends of the conductors A and B, respectively, in any well-known manner, e.g., by a vapor deposition in a vacuum. As a result of the additional sheathing 3,3', whereby the end surface of the conductor is sufficiently large to receive the required reflecting surface, these end surfaces of the conductors can be surface polished prior to the application of the reflective surfaces 4, 4' to assure that the reflective surfaces will be planar and perpendicular to the axis of the respective conductors. Each of the reflective surfaces or mirrors 4, 4' is provided with a light permeable aperture or opening 13, 13', respectively, which is aligned with the respective inner core 1, 1' of the coaxial glass fiber waveguide. The diameter of the apertures 13, 13' may be larger than the diameter of the respectively coupled inner core 1, 1' so that all of the energy which is conducted in the narrow zone along the border areas with the outer cores 2, 2' may be coupled in or out of the apertures without being reflected.

The two reflecting surfaces or mirrors 4, 4' are positioned so that they face each other in a substantially coaxial manner and are spaced from each other by a distance so as to form the end surfaces or define an optical resonator 5 for the light of the modulated beam in the coupling medium between the two reflective surfaces. That is, the spacing between the reflective surfaces 4, 4', and therefore, the length of resonator 5 is from one to a plurality of half-wavelengths of the wavelength of the transmitting beam, for example, the laser beam. Of course, if instead of utilizing air as the coupling medium between the reflecting surfaces 4, 4' a glass body id employed as the coupling medium, then the length of the resonator 5 must be calculated with the wavelength through glass. Such a glass body, for example, could consist of a light-conductive fiber having an inner core diameter which is larger than the diameters of the apertures 13, 13' in the reflecting surfaces 4, 4', respectively.

Various specific features of the resonator utilized according to the invention to couple two optical devices may be modified without departing from the basic concept of the invention. For example, the two reflective surfaces or mirrors 4, 4', need not necessarily be planar as illustrated, but rather may also be concave mirrors as are known for laser resonators in order to provide for focusing of the reflected light. Additionally, a lens may be built into the resonator if desired, or a light-conductive fiber may be utilized as the coupling medium which fiber has a parabolic index of refraction curve through its cross section. Light-conductive fibers exhibiting this property are known under the name of "Selfoc-fiber." Additionally, the resonators may be constructed either as open or closed resonators. A closed resonator is a reflecting device in which, contrary to an open resonator means are provided for prohibiting the light beams to from leaving the resonator in directions different from those being determined by the light permeable apertures.

Figure 2:
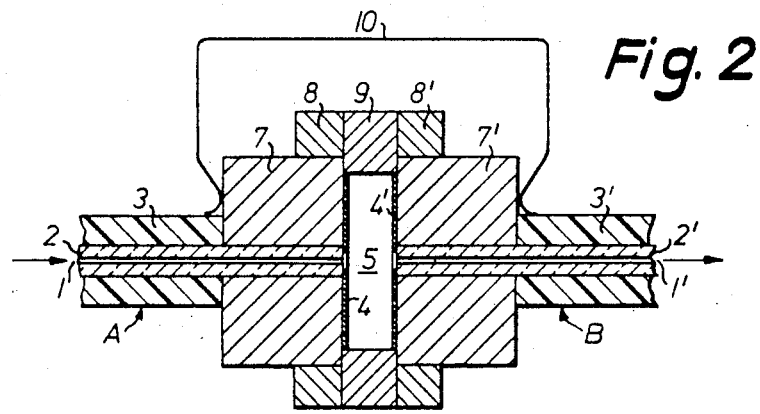
FIG. 2 is a schematic sectional view of another embodiment of a coupling arrangement according to the invention for coupling together two light fiber conductors.

In the embodiment of FIG. 1, the spacing and adjustment of the resonant surfaces 4, 4' in order to provide the desired resonator 5 and to set the transmitted light energy to the maximum value, is provided by a mounting and adjustment device provided for each of the conductors A and B and which are indicated schematically by the reference numerals 6, 6', respectively. Alternatively, as shown in FIG. 2, the individual mounting and adjustment devices 6, 6' may be eliminated and the length of the resonator 5 determined by means of a planar spacer ring 9. In the embodiment of FIG. 2, the external sheathing 3, 3' is removed from a portion of the ends of the light fiber conductors A and B which are then provided with mounting blocks 7, 7' to whose end surfaces the reflective layers or mirrors 4, 4' are applied. The planar spacer ring 9 is held in place by two coaxially disposed rings 8, 8' which are applied to the respective mounting blocks 7, 7' and which are held in their desired mounting position by means of a claim 10. If a glass body is used as the coupling medium in the resonator or interferometer 5, then, accurate adjustment of the two reflective surfaces 4, 4' by means of adjustment devices such as 6, 6' in FIG. 1 or the spacer ring 9 of FIG. 2 is not required, since in such case only the glass body need be manufactured with a particularly high precision as concerns both parallelism and length.

With the coupling between the two coaxial fiber waveguides being provided by the resonator according to the invention, mode mismatching is effectively eliminated. Even a relative displacement between the two light fiber conductors A and B by many wavelengths so that the axes thereof are no longer coaxial is entirely insignificant with this coupling arrangement. This is due to the fact that the input waveguide A transfers its energy into the resonator 5 and the output waveguide B comes in contact only with the resonator. It is additionally insignificant in which the resonator or interferometer 5 is resonating, since the output waveguide conductor couples only the energy distribution which is appropriate to it.

Figure 3:
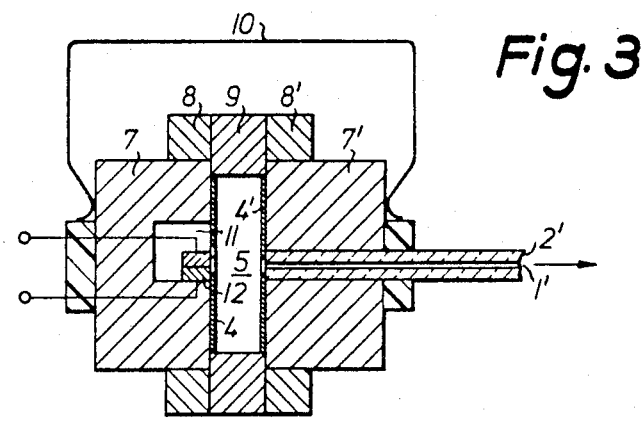
FIG. 3 is a schematic sectional view of the embodiment of the invention shown in FIG. 2 which has been modified to couple together a light fiber conductor and a semiconductor laser or photodiode.

The coupling arrangement according to the invention and the characteristics thereof may also be utilized in an arrangement wherein one of the optical devices to be coupled is the semiconductor laser diode itself rather than a coaxial light fiber conductor. Such an arrangement is shown in FIG. 3 wherein the mounting block 7 is modified so as to include a cavity 11 in which is situated the semiconductor laser diode 12 so that it can emit a light via the aperture 13. It is known that laser diodes radiate a plurality of modes and that it is very difficult to have such a diode resonate in a pure mode at the lowest radially symmetrical fundamental mode which is suitable for the light conductive fiber.

By coupling the output of the laser 12 to the inner core 1' of the lightwave conductor B via a resonator or interferometer 5 according to the invention, a mixture of very many modes will be balanced out as a result of such coupling. In the steady-state condition there exists a certain relationship between the energies in the individual modes present in the resonator. If the energy is coupled out only for that mode which can be accepted by the glass fiber B coupled to the resonator, this balance is disturbed with the result that it is reproduced with the aid of mode conversion processes along the edges of the resonator so that energy in the attenuated mode is continuously resupplied. Only the transmittable mode thus acts in the sense of damping the laser resonator of the semiconductor diode 12, the other initially interfering modes participate essentially only in the turnover of reactive power.

The reverse arrangement is, of course, also conceivable, that is, the transmission of modulated light beams from a light-conductive fiber to a photodiode. This process may be realized by an arrangement as shown in FIG. 3. In this case, however, the numeral 12 represents a photodiode and the light beams are brought to the resonator 5 through the light-conductive fiber 1', 2'. Those modes suitable for the photodiode are then coupled out of the resonator 5.

In the manufacture of the coupling resonator according to the invention, it is important to assure accurate alignment of the apertures 13, 13' with the optical devices connected thereto, e.g., the light fiber conductors A and B of FIG. 1. According to a further feature of the invention, a method of producing these apertures is provided which includes the simultaneous accurate adjustment of the mirrors or reflective surfaces with respect to the light-conductive fibers. According to this preferred method, a solid mirror surface is initially vapor deposited on the end surface of either the conductor of FIG. 1 or the mounting block 7 of FIGS. 2 and 3 and a layer of photosensitive lacquer material, which has the characteristic that it becomes chemically removable after exposure to light, is applied to the free side of the reflective surface, i.e., the side opposite that to which the optical device is connected. The lacquer layer is then exposed by the admission of a beam of light through the inner core 1 or 1' of the connected waveguide and the exposed portion of photolacquer layer is removed with the appropriate chemical means to form an opening which exposes the underlying portion of the mirror at the desired spot. The exposed portion of the mirror or reflective surface is then etched in a known manner to remove same and finally the remainder of the lacquer layer is removed. The fact that the mirror does, of course, not reflect a full one hundred percent but that a remainder is left for exposing the photolacquer is here particularly utilized. In this way, it is also possible to provide a mirror with a hole in a semiconductor laser. It is, however, also possible, because of the larger size of the opening, to produce the aperture with the aid of a photolacquer process by external exposure in the conventional manner.

It will be understood that the above description of the present invention is susceptible to various modifications, changes and adaptations, and the same are intended to be comprehended within the meaning and range of equivalents of the appended claims.

We claim:

1. An optical coupling arrangement for transmitting data modulated light beams from the output of a first optical device to the input of at least one other optical device comprising, in combination:

a pair of reflecting surfaces each of which includes at least one mirror which has a high reflection capability, said reflecting surfaces facing one another and being spaced with respect to one another to define an optical resonator for the wavelength of the light to be transmitted in the coupling medium between the two reflecting surfaces;

each of said reflecting surfaces being provided with a light permeable aperture the diameter of which is a small relative to the surface area of the associated reflecting surface, the output of said first optical device being coupled to said resonator via one of said apertures and the input of said other optical device being coupled to said resonator via the other of said apertures.

2. The coupling arrangement as defined in claim 1 wherein said reflecting surfaces form an open resonator.

3. The coupling arrangement as defined in claim 2 wherein light-refracting elements are inserted into said open resonator.

4. The coupling arrangement as defined in claim 2 wherein said coupling medium is air.

5. The coupling arrangement as defined in claim 1 wherein said reflecting surfaces are constructed as a closed resonator.

6. The coupling arrangement as defined in claim 4 wherein said coupling medium is glass.

7. The coupling arrangement as defined in claim 6 wherein said coupling medium comprises a glass fiber whose core diameter is large compared to the diameter of said light permeable apertures.

8. The coupling arrangement as defined in claim 1 wherein said apertures are substantially coaxial.

9. The coupling arrangement as defined in claim 1 wherein said reflecting surfaces are planar.

10. The coupling arrangement as defined in claim 1 wherein said reflecting surfaces are constructed to be focusing.

11. The coupling arrangement as defined in claim 1 wherein at least one of said optical devices is a glass fiber waveguide.

12. The coupling arrangement as defined in claim 1 wherein at least one of said optical devices is a photodiode.

13. The coupling arrangement as defined in claim 1 wherein at least one of said optical devices is a laser diode.

* * * * *